(12) United States Patent
Penning et al.

(10) Patent No.: US 9,346,254 B2
(45) Date of Patent: May 24, 2016

(54) PROCESS FOR PRODUCING A POLYMER COATED METAL SUBSTRATE AND A METAL STRIP SUBSTRATE PROVIDED WITH A POLYMER COATING

(75) Inventors: Jan Paul Penning, The Hague (NL); Anke Marja Berends, Driehuis (NL); Michiel Steegh, Driehuis (NL); Cornelis Johannes Waringa, Amstelveen (NL)

(73) Assignee: TATA STEEL IJMUIDEN BV, Ijmuiden (NL)

( * ) Notice: Subject to any disclaimer, the term of this patent is extended or adjusted under 35 U.S.C. 154(b) by 312 days.

(21) Appl. No.: 14/113,955

(22) PCT Filed: Apr. 26, 2012

(86) PCT No.: PCT/EP2012/057645
§ 371 (c)(1),
(2), (4) Date: Nov. 25, 2013

(87) PCT Pub. No.: WO2012/146654
PCT Pub. Date: Nov. 1, 2012

(65) Prior Publication Data
US 2014/0072742 A1   Mar. 13, 2014

(30) Foreign Application Priority Data
Apr. 28, 2011   (EP) .................................... 11164219

(51) Int. Cl.
| | | |
|---|---|---|
| *B32B 15/00* | (2006.01) | |
| *B32B 38/00* | (2006.01) | |
| *B29C 65/00* | (2006.01) | |
| *B32B 15/04* | (2006.01) | |
| *B32B 15/08* | (2006.01) | |
| *B32B 15/082* | (2006.01) | |
| *B32B 15/088* | (2006.01) | |
| *B32B 15/09* | (2006.01) | |
| *B29C 65/70* | (2006.01) | |

(52) U.S. Cl.
CPC ............. *B32B 38/0012* (2013.01); *B29C 65/70* (2013.01); *B32B 15/04* (2013.01); *B32B 15/08* (2013.01); *B32B 15/082* (2013.01); *B32B 15/088* (2013.01); *B32B 15/09* (2013.01); *B32B 2419/00* (2013.01); *B32B 2605/08* (2013.01); *B32B 2605/18* (2013.01); *Y10T 428/1355* (2015.01); *Y10T 428/31678* (2015.04); *Y10T 428/31681* (2015.04); *Y10T 428/31692* (2015.04)

(58) Field of Classification Search
CPC .... B32B 38/0012; B32B 38/00; B32B 15/00; B32B 15/04; B32B 15/08; B32B 15/082; B32B 15/088; B32B 15/09; B29C 65/00; B29C 65/70
See application file for complete search history.

(56) References Cited

FOREIGN PATENT DOCUMENTS

| | | |
|---|---|---|
| EP | 0312304 A1 | 4/1989 |
| EP | 1378344 A1 | 1/2004 |
| GB | 1566422 | 4/1980 |
| JP | 2004042618 A | 2/2004 |
| JP | 2004091561 A | 3/2004 |

OTHER PUBLICATIONS

International Search Report dated Jun. 11, 2012 from International Application PCT/EP2012/057645 to Tata Steel Ijmuiden BV filed Apr. 26, 2012.

*Primary Examiner* — Michael N Orlando
*Assistant Examiner* — Matthew Hoover
(74) *Attorney, Agent, or Firm* — Vorys, Sater, Seymour and Pease LLP

(57) ABSTRACT

A process for producing a polymer coated metal substrate metal strip substrate provided with a polymer coating.

15 Claims, 4 Drawing Sheets

PROCESS FOR PRODUCING A POLYMER COATED METAL SUBSTRATE AND A METAL STRIP SUBSTRATE PROVIDED WITH A POLYMER COATING

CROSS-REFERENCE TO RELATED APPLICATIONS

This is a §371 US National Stage Application of International Application No. PCT/EP2012/057645 filed on 26 Apr. 2012, claiming the priority of European Patent Application No. 11164219.5 filed on 28 Apr. 2011.

This invention relates to a process for producing a polymer coated metal substrate and a metal strip substrate provided with a polymer coating.

In the packaging industry the use of polymer-coated substrates is becoming more and more common in the production of cans. The polymer coated substrate can be produced by extruding a molten polymer film directly onto the metallic substrate or by producing a thermoplastic polymer film that is subsequently laminated, as a solid film, onto a metallic substrate in an integrated or separate lamination process step.

Lamination is usually performed by leading the polymer film and the substrate through a lamination nip formed by two or more rolls pressing the coating onto the metallic strip. A proper adhesion between the polymer film and the substrate is achieved by heat sealing of the polymer coating film onto the metallic substrate, wherein the film and/or the substrate may be heated to promote the heat sealing, or by using an (liquid) adhesion promoter that is applied to the polymer coating film and/or the substrate prior to the lamination step and which is subsequently cured to obtain the adhesive effect.

Depending on the nature of the thermoplastic polymer that is used, the speed of the substrate through the extrusion process is limited. For instance, for thermoplastic polyesters, which are commonly used in polymer-metal laminates, extrusion speeds are limited to about 150 to 250 m/min, depending on the specific line and polymer. EP1019248 discloses an extrusion process wherein the line speeds is limited to the speed when cast film PET reaches the upper extrusion limits. The limit is experienced by instable edges and flow instabilities. A separate film lamination process allows higher processing speeds, but processability and success of the lamination step is strongly dependent on the mechanical and physical properties of the film. The extruded films from thermoplastic polyesters such as PET are mechanically very weak and cannot be used in a film lamination process at a commercially viable speed. Moreover, cast polyester films are susceptible to 'physical aging', which tends to further degrade the mechanical properties and handling characteristics when the cast film is stored. For these reasons polyester films for laminating onto metallic substrates are usually bi-axially drawn to achieve the necessary level of mechanical strength and stability. However, the manufacture of bi-axially drawn polyester films requires complex and large-scale equipment at excessive capital expenditure and, due to the scale of the process, does not easily allow changes in e.g. polymer film composition. Also, because bi-axially drawn films are prone to shrink upon heating, they need to be annealed or heat-set prior to lamination, leaving the final drawn film highly crystalline. This is unfavourable with respect to adhesion between the polymer film and the metal substrate, and strongly limits the formability of the polymer-coated substrate.

EP0312304 discloses a process in which a polymer film is laminated to the steel substrate. A post heat after lamination is applied to produce a substantially amorphous coating. The product described is based on bi-axially oriented or just plain cast film. The bi-axially oriented film has the disadvantages as described hereinabove. Using plain cast film is mechanically weak and has poor web handling characteristics which may deteriorate even further by physical aging.

It is an objective of this invention to provide an alternative process for producing a polymer film for producing polymer-coated metallic substrates.

It is also an objective of this invention to provide a process for producing a polymer coated substrate at high speed.

It is also an objective of this invention to provide a process for producing a polymer coated substrate at high speed requiring a lower capital expenditure.

It is also an objective of this invention to provide a process for producing a polymer coated substrate wherein the polymer allows the use of lower amounts of stabilisers, anti blocking agents or similar compounds.

One or more of these objectives are reached by a process for producing a polymer coated metal substrate comprising the steps of:
  providing a metal strip as a substrate;
  providing a polymer film for coating onto the substrate;
  optionally providing an adhesion layer for promoting the adhesion between the substrate and the polymer film;
wherein the polymer film consisting of one or more layers is produced by:
  melting a suitable mixture of polymer granules in one or more extruders;
  passing the molten polymer through one or more dies or calendars to form the polymer film consisting of the said one or more layers;
  cooling the extruded polymer film to form a solid polymer film;
  trimming the edges of the extruded polymer film;
  reducing the thickness of the solid polymer film by stretching the solid polymer film by exerting a stretching force only in the longitudinal direction;
  optionally trimming the edges of the stretched polymer film;
  laminating the stretched polymer film onto the substrate to produce a polymer-coated substrate;
  post-heating the polymer-coated substrate to reduce the orientation and crystallinity of the polymer film;
  cooling, preferably fast cooling, the post-heated polymer-coated substrate.

The stretched polymer film can be produced in a two-step process (film extrusion and stretching done separately) or in an integrated process (film extrusion combined with stretching). In the extrusion process, a molten polymer film consisting of one or more layers is produced by melting a suitable mixture of polymer, e.g. in the form of granules, in one or more extruders and passing the molten polymer through an extrusion die, usually a flat die. The molten polymer film is solidified, e.g. by casting it onto a cooled roll, or in case of a calendar process, between two or more rolls. The film is then essentially amorphous and non-oriented. When the film contains more than one layer, obtainable for instance by co-extrusion, one of the outer layers will function as a so-called adhesion layer, having a composition such that it will create a better bond to the metal than the other layers. After casting, thick edges of the film resulting from 'neck in' are trimmed off. The trimmed-off material may be fed back into one of the extruders, optionally after intermediate reprocessing, to limit material losses and to optimise cost efficiency. The cast and trimmed film is either coiled onto a reel or passed on directly to the feeding roll of the stretching unit.

In the stretching process, the solid polymer film is fed through an appropriate stretching unit. This stretching unit may comprise a series of rolls. First, the film is heated, e.g. by one or more heating rolls, to a suitable temperature for stretching. The film then proceeds to feeding rolls which set the entrance velocity for the stretching process ($v_{in}$). The film subsequently proceeds to drawing rolls running at a higher speed than the feeding rolls ($v_{out}$) to accomplish the stretching process. The distance between the feeding and drawing rolls, the drawing gap, is an important parameter which may be varied to achieve an optimum drawing process. The film is subsequently optionally passed on to one or more annealing and/or cooling rolls which may be utilised to anneal and/or cool the film in an appropriate way. All stages of the drawing process are conducted under well-defined film tension levels, which can be controlled by setting appropriate speeds, temperatures, etc. of the individual rolls. Lay-on rolls are preferably used on the rolls in the stretching process to prevent air entrapment between the film and the rolls. Most preferably these lay-on rolls are present on at least the heating and drawing rolls.

After completing the stretching, the film edges may be trimmed to ensure proper winding and further processing of the drawn film. At this stage, the amount of material that needs to be trimmed off is usually very small. After stretching and the optional trimming the film is coiled on a reel. Between stretching and coiling, one or more of defect inspection, gauge measurement, surface treatment (corona, flame, spraying of (liquid) additives or agents, etc.) and/or slitting into multiple widths may be performed. When the casting and stretching is done at multiple widths of the final end product, the relative fraction of the material trimmed off and potentially lost is substantially smaller, thus resulting in a higher yield. When the stretching is done in-line with the film casting, the gauge measurement system after stretching can be used for the control system of the extrusion die, which controls the shape of the molten web coming onto the cast roll.

A disadvantage of the non-oriented solid polymer film is that it is mechanically weak and possibly brittle. However, the inventors found that it can be processed excellently in the longitudinal stretching process because the film is relatively thick at that stage of the process. Also, the above-mentioned physical aging process does not severely limit the processability of the cast film, provided that it is sufficiently thick. The inventors found that a suitable minimum thickness of the solid polymer film prior to stretching is in the order of 50 micron. The stretched films have a thickness that corresponds to the desired final thickness of the polymer coating on the metal substrate. In other words, laminating the stretched film onto the metal substrate produces directly the desired coating thickness. Typically, the thickness of the stretched film is between 5 and 50 microns.

In the process according to the invention it is essential that the cast film is oriented in the longitudinal direction only and not in the transverse direction (LDO=Longitudinal Direction Orientation). Any stretching operation inevitably results in a reduction of the thickness and width. However, no external forces are applied in the width or thickness direction. Transversally oriented (TDO) or bi-axially oriented (BO) might also provide a film in the desired gauge, but these films do not possess the desired properties. During post heating any stretched films shrinks. The TDO films will show shrinkage in the transverse direction, whereas BO-films will shrink in the transverse and longitudinal direction. This makes it difficult to control the width of the applied coating film in relation to the width of the metal substrate onto which it is applied. Since the LDO-film is stretched in the longitudinal direction only, it will only exhibit shrinkage in that direction and shrinkage can be suppressed simply by controlling the film tension in that direction. Also, equipment for performing transversal and bi-axial orientation is much more complex, and for instance requires the use of a tenter frame, and is consequently expensive and inflexible resulting in a more expensive polymer film.

The invention combines cast film production with longitudinal stretching only to achieve the required coating thickness and physical/mechanical properties of the coating film. This film is preferably not produced in line with the lamination step to avoid the problems of disturbances in a chain process, although it is in principle possible to conduct the casting, stretching and lamination in-line. As the stretched polymer film may be highly crystalline and/or oriented and/or exhibit porosity, the metal substrate coated with this film is heated to a post heat temperature designed to remove all orientation and crystallinity present in the coating. A subsequent rapid cooling step creates a polymer coated metal strip with a highly amorphous polymer (i.e. largely non-crystalline) coating. This material is suited to create a very good formable material, with excellent adhesion and barrier properties, and thus very suitable for making e.d. deep drawing cans. Essential is the high speed with which this process can be used. Only technical limitations and control issues limit the speed at which the laminating line can be run. The inventors found that the process can be excellently performed at line speeds of from 400 to 700 m/min. Higher speeds of up to 1200 m/min are currently being considered.

The inventors found that polymer films, such as polyester films, which are perfectly suitable for lamination onto metallic substrates at high speed, can be produced by the inventive process. The polymer film is cast at a relatively high thickness and subsequently drawn and oriented in the longitudinal direction only (LDO=Longitudinal Direction Orientation). By the LDO-process, the film becomes longer and thinner, and the desired final thickness of the polymer coating film is thereby achieved. Also, if the drawing process is conducted under the proper conditions, the film will achieve high mechanical strength and good handling characteristics for high speed lamination, and is freed from physical aging, thus allowing virtually unlimited storage of the LDO-film prior to lamination. To improve the surface properties of the metal strip, it is possible to add a surface treatment of the steel and/or the film prior to the entry in the lamination nip. Examples are ozone generators, corona treatment or flame treatment. These additional treatments are not essential, but give an improved performance if needed.

Also, after the final quenching step following the post heat step additional heat treatments can be applied with which the physical structure of the coating (e.g., crystallinity) can be further modified. Examples for such a treatment are flame treatment, corona treatment, infrared heaters, lasers or hot air furnaces. This treatment can further improve the barrier properties of the film at the expense of some of the formability of the polymer. However, for some particular applications this loss of formability may be justified.

Preferably the stretching step is performed above the glass transition temperature ($T_g$) of the polymer or polymer mixture constituting the main layer of the film, or above the $T_g$ of any other polymer or polymer mixture which may be present in layers other than the main layer of the film.

An important parameter of the stretching step is the so-called draw ratio. It may be defined in various ways. First of all the machine draw ratio may be defined as $MDR=v_{out}/v_{in}$. Secondly the film draw ratio may be defined as $FDR=d_{in}/d_{out}$, where $d_{in}$ and $d_{out}$ represent the thickness at the centre of the film before and after stretching, respectively. In the absence of transverse contraction of the film during uniaxial stretching MDR and FDR have the same value. By assuming constant volume it can be derived that FDR/MDR=WR, where WR is the width of the drawing film expressed as a fraction of the width of the undrawn film. WR is always equal to or less than 1, the actual value depending on drawing conditions and polymer film composition. It should be noted that due to recrystallisation the assumption of constant volume is not always accurate, but this does not take away the usefulness of WR as a parameter controlling the stretching process. Preferably, WR is as high as possible, i.e. close to 1 resulting in no or a very small reduction in width as a result of the stretching, but it should be at least 0.7 to have an acceptable process, both from a film quality and process control point of view. Preferably WR is at least 0.8 and more preferably 0.9. The degree of width reduction is dependent on the polymer to be stretched. For instance, a film according to recipe E in Table 1 showed a width reduction of about 30% whereas the films according to recipes B, C and D in Table 1 showed values of about 15% width reduction.

The maximum value of FDR and MDR are determined by polymer film composition and drawing conditions. It typically ranges from 4-6 for polyester films and from 4-12 for polyolefines such as polypropylene or polyethylene. There is also a minimum value for MDR at which the process should be operated in order to obtain a suitably stretched film. Amorphous, non-oriented polymer films tend to deform by an inhomogeneous, neck-type deformation. Below the so-called 'natural draw ratio', the drawn material will exhibit both drawn and undrawn portions, leading to a film that is inhomogeneous, both in thickness and in width. At draw ratios above the natural draw ratio, the film will show homogeneous deformation and exhibit 'strain hardening' behaviour. MDR should therefore be set at values above the natural draw ratio, so as to achieve homogeneous drawing corresponding to the strain hardening regime. The minimum draw ratio can be found by inspection of the stress-strain curve of the undrawn film.

The inventors found that the stretched films may still be subject to physical aging and brittleness if the draw ratio is too low. In terms of its physical structure, films with too low draw ratios still contain a highly mobile amorphous phase which undergoes physical relaxation processes and is responsible for the observed film brittleness. The undesired mobile amorphous phase can be detected for instance by thermal analysis. Drawn films exhibiting this phase will show a distinct glass transition in e.g. a differential scanning colorimetric (DSC) spectrum.

Consequently, the applied draw ratio should exceed the natural draw ratio of the polymer in order to obtain a homogeneous film and to enable a stable drawing process, and should furthermore be sufficiently high to eliminate a mobile amorphous phase that leads to an undesirable physical behaviour of the drawn film.

The time between the coiling of the stretched film and the lamination onto the metal strip can vary between almost immediately after stretching and coiling, or even in-line without intermediate coiling, to very long. The stability of the sufficiently stretched film is such that the film can be stored for up to 5 years or longer. However it is preferable to process the film within 6 months, and even more preferably within 1 month. Lamination of the stretched film onto the metal substrate is preferably accomplished in a process separate from the stretched film production because of the vulnerability for disturbance in the chain of high speed processes.

Lamination can be performed in the same line where a metallic coating on the strip is applied, for example a tinplating line. It could also be done in a stand-alone, independent lamination line. The lamination onto the substrate is done using pressing rolls. It can be done on one side or two sides, depending on the application of the coated metal strip. Always a pair of rolls is used for pressing the film against the metal. When coating both sides of the substrate with the stretched film, it can be done simultaneously or in two steps.

To achieve a good bond between the metal and polymer film, two adhesion techniques can be used. The first technique involves the use of a (liquid) adhesion promoter or primer. The adhesive layer is applied in e.g. liquid form for example by dipping, spraying or roll coating. The layer can then be heated to a required drying or curing temperature and the applied heat also helps promoting adhesion between the primer layer and the polymer film. The second method is known as heat seal lamination. The metal is heated to a temperature which results in softening of the layer of the film which is brought in contact with the metal. This layer is known as the adhesion side or, when a multi layer film is used, the adhesion layer. The required substrate preheat temperature depends on the polymer to be laminated upon the substrate. For amorphous polymers the temperature is at least 50° C. above the Tg. For (semi-)crystalline polymers, the substrate preheat temperature is between 10 to 50° C. below the melting point of the highest melting polymer in the adhesion layer. The exact temperature used is calculated using for example viscosity data of the polymers used, the line speed, the lamination pressure, the modulus of the film, the roughness of both the film and the metallic strip, etc. The preheat temperature is chosen such that the adhesion layer will completely cover the roughness of the metal strip, where the outside of the film, touching the laminating rolls should not exceed the sticking temperatures of the film on the lamination rolls to prevent sticking of the film to these rolls.

After the metal substrate has been prepared in a suitable way (i.e. having an adhesive layer and/or being heated to the proper pre-heat temperature), the stretched polymer film is brought in contact with the strip using laminating rolls. These rolls are pressed onto the metal strip to generate a good bond. The laminating rolls are at least cooled on the outside, but could also be cooled on the inside. The rolls should be sufficiently large to create sufficient time in the lamination nip to generate a good bond. The tension in the polymer film should be carefully controlled, as it may exhibit the tendency to shrink when its temperature increases. Since the film is stretched in the longitudinal direction only, it will only exhibit shrinkage in that direction and shrinkage can be suppressed simply by controlling the film tension in that direction.

The lamination pressure in the laminating step, e.g. in the lamination nip between two laminating rolls, is preferably between 0.1 MPa and 10 MPa. Higher values will result in excessive wear of the lamination rolls, lower pressure will result in insufficient adhesion between the coating and the metal and in an increased risk of air entrapment. Preferably the lamination pressure is at least 0.5 MPa and/or most 2.5 MPa.

After the nip, the coated strip is optionally cooled using e.g. cold air, in order to impart sufficient rigidity, strength and/or toughness for further handling of the semi-finished product and to allow contact with additional rolls which may be present in the lamination process (deflector rolls etc).

After cooling, the essential post heating step is applied. The temperature setting of the post heat is defined by the polymer properties. The stretched film is highly oriented and, if crystallisable polymers are used, highly crystalline. The post heat temperature is chosen such that that the orientation and crystallinity is removed within the chosen residence time in the post heat section. The residence time is preferably at least 0.1 and preferably at most 10 seconds, or preferably at most 5 seconds. For polycondensates, such as polyesters or polyamides, the post heat temperature is preferably between Tm and Tm+50° C. For non-crystallisable vinyl polymers, such as polystyrene or polyacrylate, the post heat temperature is preferably between Tg+50° C. and Tg+150° C. and for crystallisable polyaddition polymers, such as polyolefins, the post heat temperature is preferably between Tm+50° C. and Tm+150° C. Although it is preferable that all orientation and crystallinity is removed, a small amount of crystallinity and/or orientation is allowable. However, this must not exceed more than 10% of the crystallinity and/or orientation which existed prior to the post-heat. A method for measuring crystallinity by X-ray diffraction is given in GN1566422, page 5 line 31-50. Alternatively the crystallinity can be determined from density measurements as described in EP0312304, page 2, line 27-37, Crystallinity can also be determined by differential scanning calorimetry (DSC), e.g. using a Mettler Toledo DSC821e calorimeter operated at a sample heating rate of 10° C./min. The hot metal coated strip is cooled very rapidly after exiting the post heat section. This is preferably done in a cold water bath, but could also be done with cooled rolls or cold gasses, as long as the cooling rate of the polymer film is at least 100° C./s, more preferably at least 400° C./s.

The film made and wound is normally made with a limited amount of standard widths. The width is set after the stretching line using slitting equipment, for example knives. The product width, that is the width of the metal strip, could be different than the standard width of the film. Therefore, the film will be trimmed to about the product width using slitting equipment, for example knives, just prior to lamination. The trimmed width is preferably a fraction of a millimeter smaller than the product width, as too wide films will create quality problems, such as thick edges after the post heating step.

Although the polymer film produced according to the invention can be used for applications other than cans or containers, it is particularly suitable for those applications where properties like adhesion, barrier properties and formability are essential. This makes it very suitable for the production of cans and containers. However the film may also be used in the production of laminated metal substrates for building materials, furniture or materials for transport applications (automotive, aerospace, etc).

Polymer-metal laminates made using this process may be used for cans or containers, more preferably formed cans made using deep drawing and/or stretching and/or wall ironing.

The polymer films coatings that can be produced by the process according to the invention are preferably based on polyesters, co-polyesters (including PET, PBT), polycarbonates, polyamides, polyolefins, elastomers, PVC, PVDC or any other polymer that can be formed in a film by extrusion. The polymer coating may consist of one or more layers.

The process according to the invention has particular advantages when producing polymer films which consist of essentially linear, thermoplastic polymers produced by polycondensation reactions (polyesters, polyamides, polycarbonates, polyimides etc). This structure limits the speed at which these polymers can be extruded and therefore extrusion coating for these polymers is limited to low speeds. For polyolefins such as PE and PP, the maximum possible extrusion speeds are much higher due to their molecular architecture (high molecular weight, short-chain branching, long-chain branching, etc). Extrusion and extrusion coating at >600 m/min is known for polyolefins.

The metallic substrate can be an uncoated metal such as steel or aluminium or aluminium alloys or a metallic-coated metal such as tinplate or galvanised steel, and may contain an additional conversion layer or passivation layer to further enhance the product performance and/or promote adhesion between the metal and the polymer coating. This additional conversion layer or passivation layer can e.g. be based on chromium oxide, chromium/chromium oxide, titanium oxide, zirconium oxide, phosphates.

The present invention is aimed to produce polymer-coated materials at high productivity with relatively low capital expenditure (compact unit operations), relatively low fixed costs whilst maintaining the variable costs (high line speed) and flexible production logistics (integrated drawing or not, variable storage time possible, easy polymer change-over). Enabling high line speed is one of the key benefits of this invention but it will also work at lower line speeds. The process according to the invention provides excellent polymer-coated metals, which can be produced at extremely high speeds having excellent properties to produce a can from the material. Also, the process can be operated using compact unit operations and allows high flexibility in product composition and production logistics.

The invention will now be explained further by means of the following non-limiting figures and examples.

FIGURES

EXAMPLES

Figure 1:
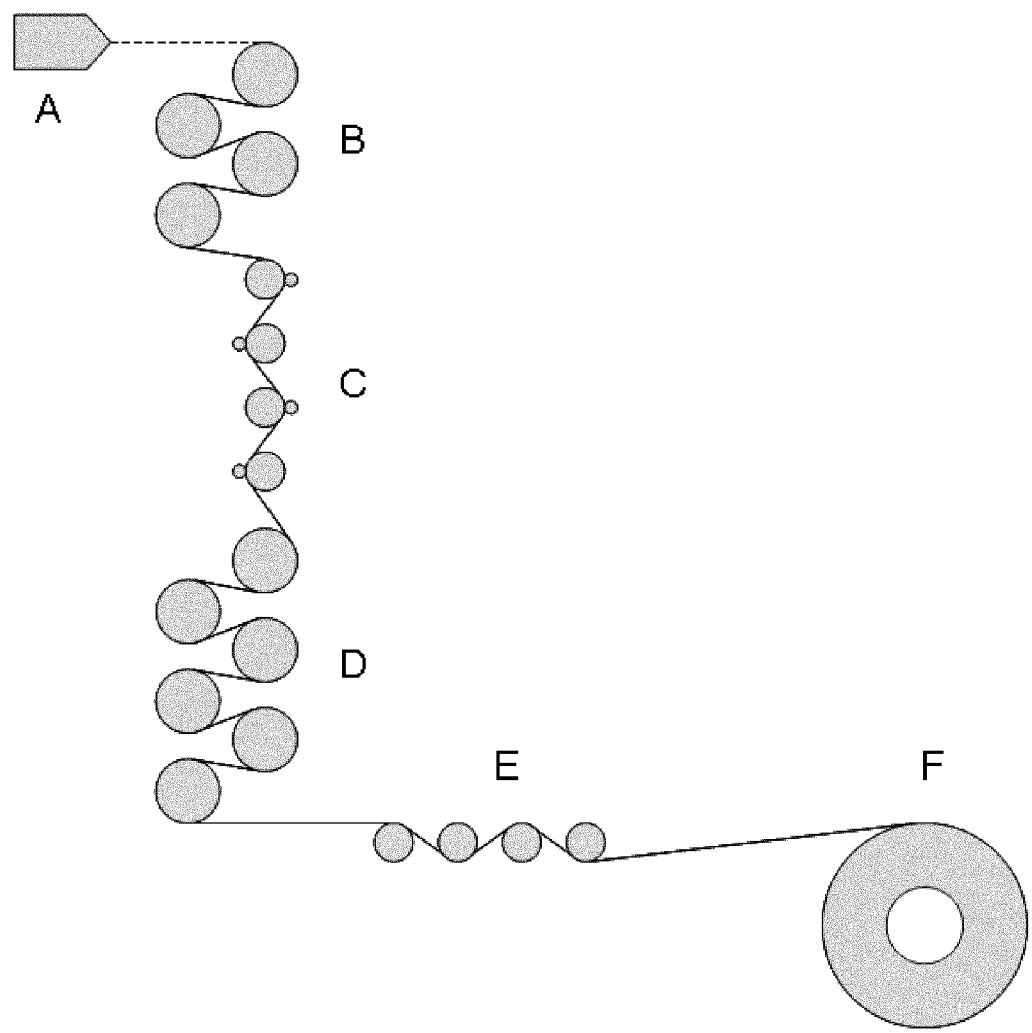
FIG. 1 shows a schematic representation of the LDO-process.

Polymer films were obtained by means of an extrusion unit consisting of a drying system for polymer granulate, granulate dry-blending and mixing system, three separate single-screw extruders, a feedblock and die assembly, a chilled cast roll and a winder for the produced cast film.

Appropriate dry blends of polymer granules were fed to the three extruders, where the granules are melted, pressurised and transported to the feedblock, and subsequently passed through a flat die, so as to obtain a three-layer film having an adhesion layer, a main layer and a top layer. The extruded film is cast onto the chilled cast roll, cooled, edge-trimmed and wound onto the winder. The amount of polymer passed through the extruders per unit time (expressed as g/min) and the final winding speed of the cast film are adjusted so as to achieve the desired cast film thickness.

In the Examples below, five different types of polyester resin were used to produce different types of polyester films:

IPA-PET: poly(ethylene terephthalate)copolymer in which about 3 mole % of terephthalic acid monomer units has been replaced with isophthalic acid monomer units CHDM-PET: poly(ethylene terephthalate)copolymer in which about 3 mole % of ethylene glycol monomer units has been replaced with cyclohexane-dimethanol monomer units PETg: poly(ethylene terephthalate)copolymer in which about 30 mole % of ethylene glycol monomer units has been replaced with cyclohexane-dimethanol monomer units PBT: poly(butylene terephthalate)homopolymer $TiO_2$ MB: a 50/50 weight % mixture of $TiO_2$ and CHDM-PET

TABLE 1

Polyester film recipes

| Code | Adhesion layer | Main layer | Top layer |
|---|---|---|---|
| A | 70% PETg<br>30% CHDM-PET | 100% CHDM-PET | 100% CHDM-PET |
| B | 70% PETg<br>30% IPA-PET | 100% IPA-PET | 100% IPA-PET |
| C | 70% PETg<br>30% IPA-PET | 67% IPA-PET<br>33% TiO2 MB | 100% IPA-PET |
| D | 100% IPA-PET | 67% IPA-PET<br>33% TiO2 MB | 70% PETg<br>30% IPA-PET |
| E | 75% IPA-PET<br>25% PBT | 75% IPA-PET<br>25% PBT | 75% IPA-PET<br>25% PBT |

Film mechanical properties were determined using an Instron 5587 tensile tester equipped with pneumatic grips, operated at 40 mm sample gauge length and a cross-head speed of either 10 mm/min, 40 mm/min or 400 mm/min. Film samples of 10 mm in width and about 80 mm in length were cut from the films using a surgical knife. Film thickness was determined from the weight of a film sample of known length and width, assuming a density of 1380 kg/m$^3$. Brittle vs. ductile behaviour of the films was determined by testing 10 specimens of a given film at 10 mm/min and 400 mm/min cross-head speed, and establishing the number of specimens that undergo ductile fracture. Ductile fracture is understood as a strain at break higher than 10%.

Thermal properties of the films (transition temperatures and crystallinity) were determined by differential scanning calorimetry (DSC), using a Mettler Toledo DSC821e calorimeter operated at a sample heating rate of 10° C./min.

Example 1

Three-layer cast polyester films according to recipe A were produced at 100 micron cast film thickness and stretched according to the LDO process schematically depicted in FIG. 1 to various Machine Draw Ratios (MDR) in the range from 3.3 to 4.8.

FIG. 1 is a schematically representation of the process wherein A represents the production of the cast film, B is the heating section of where the cast film is heated, C is the stretching section or stretching unit where the heated film is stretched in the longitudinal direction only, D is the annealing section, E is the cooling section and F is a coiler to coil the stretched film in this embodiment.

The films were subsequently stored during at least 1 year at ambient conditions and the mechanical properties were determined in the longitudinal direction and the transverse direction. The results are given in Table 2. At MDR=3.3, the stress-strain curve of the drawn film measured in the longitudinal direction still exhibits a distinct zero-slope yield point, indicating that the applied draw ratio is rather low. At MDR=4.0 or higher, the stress-strain curves do not exhibit this zero-slope yield point but represent strain hardening properties and homogeneous deformation. It is noted that these films show a high modulus, a high strain at break and a high tenacity (stress at break), thus providing an excellent combination of mechanical properties and good handling properties. It is also noted that in the transverse direction, the film mechanical properties are not affected by the drawing process.

The drawn films were also tested at 10 mm/min and 400 m/min testing speed to establish film ductility as described above. The cast film shows some loss of ductility after storage when tested at 10 mm/min, and complete loss of ductility when tested at 400 mm/min. The high testing speed represents the behaviour of the film under impact conditions and the lack of ductility implies that the cast films, after prolonged storage, cannot be properly handled in a high-speed process. At a rather low draw ratio of MDR=3.3, the LDO drawn film retains its ductility in the longitudinal direction but not in the transverse direction. Therefore, this film also cannot be properly handled in a high-speed process. At draw ratios of MDR=4.0 or higher, the LDO drawn film retains its ductility in both longitudinal and transverse directions. This is surprising since the film was not drawn in the transverse direction. The result means that the films in this Example with draw ratios of MDR=4.0 or higher show excellent handling characteristics in a high-speed process.

Figure 2:
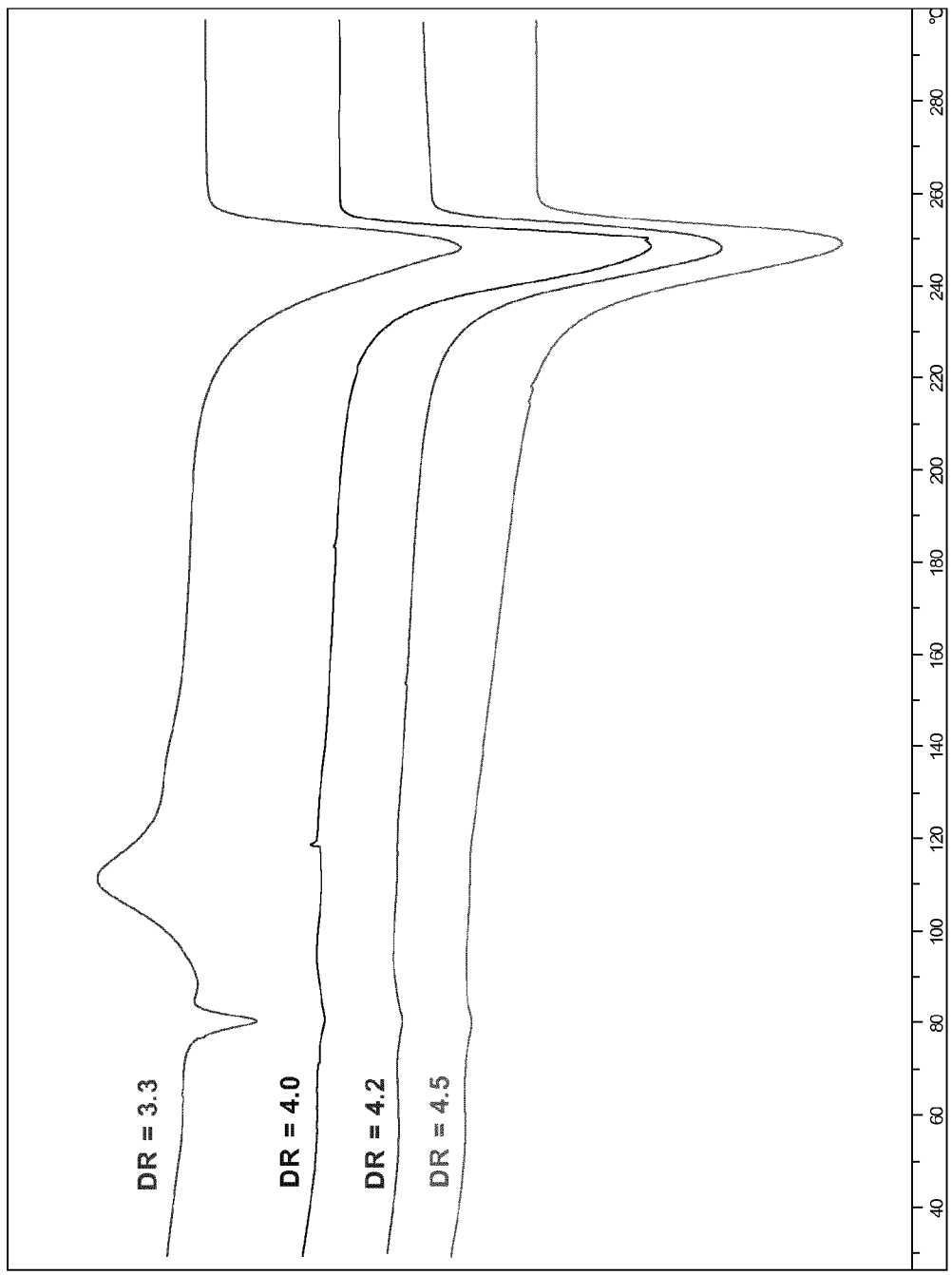
FIG. 2 shows the differential scanning calorimetry (DSC) curves of the drawn films, after aging, as a function of draw ratio.

FIG. 2 shows the differential scanning calorimetry (DSC) curves of the drawn films, after aging, as a function of draw ratio. The DSC curve for the film drawn at MDR=3.3 shows a distinct enthalpy relaxation peak at about 80° C. and a recrystallisation peak at about 110° C., meaning that the drawn film still exhibits a mobile amorphous phase and still has the capability to crystallise upon heating. The DSC curves for films drawn at MDR=4.0 or higher do not show any glass transition, enthalpy relaxation and pronounced recrystallisation peaks, meaning that their draw ratio was sufficiently high to eliminate the mobile amorphous phase and strong tendency to further crystallise.

TABLE 2

Mechanical properties measured in the longitudinal direction and the transverse direction for cast polyester film and polyester film according to the LDO process of this invention, at various Machine Draw Ratios (MDR). Testing speed 10 mm/min.

| | Longitudinal direction | | | | | Transverse direction | | | | |
|---|---|---|---|---|---|---|---|---|---|---|
| | Yield* | | Break | | | Yield* | | Break | | |
| | Strain (%) | Stress (MPa) | Strain (%) | Stress (MPa) | Modulus MPa | Strain (%) | Stress (MPa) | Strain (%) | Stress (MPa) | Modulus MPa |
| Cast film | 3.1 | 51 | 640 | 87 | 2120 | 3.2 | 57 | 555 | 76 | 2300 |
| LDO, MDR = 3.3 | 3.3 | 76 | 160 | 230 | 3530 | 3.3 | 61 | 700 | 61 | 2170 |
| LDO, MDR = 4.0 | — | — | 38 | 290 | 6960 | 4.6 | 62 | 870 | 84 | 2110 |

TABLE 2-continued

Mechanical properties measured in the longitudinal direction and the transverse direction for cast polyester film and polyester film according to the LDO process of this invention, at various Machine Draw Ratios (MDR). Testing speed 10 mm/min.

| | Longitudinal direction | | | | | Transverse direction | | | | |
|---|---|---|---|---|---|---|---|---|---|---|
| | Yield* | | Break | | | Yield* | | Break | | |
| | Strain (%) | Stress (MPa) | Strain (%) | Stress (MPa) | Modulus MPa | Strain (%) | Stress (MPa) | Strain (%) | Stress (MPa) | Modulus MPa |
| LDO, MDR = 4.2 | — | | 41 | 320 | 6900 | 4.5 | 63 | 790 | 73 | 2200 |
| LDO, MDR = 4.8 | — | | 28 | 370 | 8030 | 4.7 | 61 | 715 | 61 | 2120 |

*values for strain and stress are indicated only in case of a distinct zero-slope yield point

TABLE 3

Ductility of polyester films A after ambient storage. Ductility is expressed at the percentage of ductile fractures (see text) out of 10 test specimens, as determined at different testing speeds.

| | Machine Direction | | Transverse Direction | |
|---|---|---|---|---|
| Testing speed | 10 mm/min | 400 mm/min | 10 mm/min | 400 mm/min |
| Cast film | 90 | 0 | 60 | 0 |
| LDO, MDR = 3.3 | 100 | 100 | 10 | 0 |
| LDO, MDR = 4.0 | 100 | 100 | 100 | 80 |
| LDO, MDR = 4.2 | 100 | 100 | 100 | 100 |
| LDO, MDR = 4.8 | 100 | 100 | 100 | 100 |

Examples 2-5

Polymer films according to recipes B, C and E (Table 1) were stretched using the device shown in FIG. 1. Applied draw ratios were MDR=4.6 for films B and C, and MDR=5.0 for film E, respectively. Mechanical properties of the cast films and drawn films are given in Table 4. As can be seen, the drawn films do not show a zero-slope yield point, indicating that the applied draw was sufficiently high. All drawn films show a favourable combination of high strength and elongation. The ductility of the cast film and the drawn films is shown in Table 5. Immediately after film production, the cast films are completely ductile while after two weeks of ambient storage, the cast films show signs of embrittlement (depending on film composition). The drawn films remain completely ductile after ambient storage.

Figure 3:
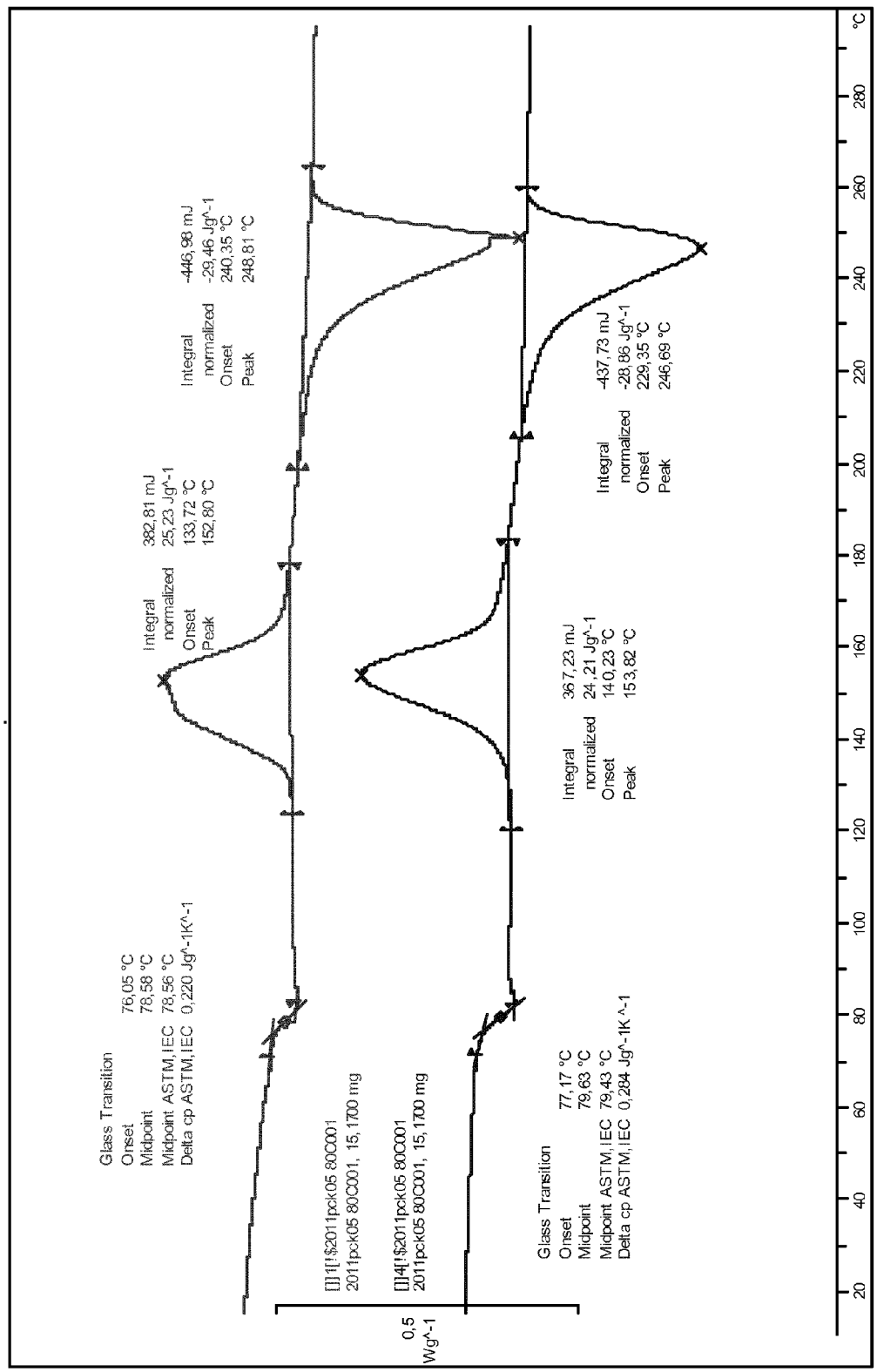
FIG. 3 shows the DSC curves of cast film B.

The DSC curves of cast film B are shown in FIG. 3. The first heating run shows a distinct glass transition at about 79° C. and a substantial recrystallisation peak with corresponding heat of recrystallisation of 25 J/g and peak temperature of 153° C. Further heating results in a melting peak with corresponding heat of fusion of 29 J/g and peak temperature of 249° C. Since an amount of crystallinity corresponding to 25 J/g was formed during recrystallisation in the DSC experiment, the film is essentially non-crystalline (latent heat of fusion is 29−25=4 J/g).

Figure 4:
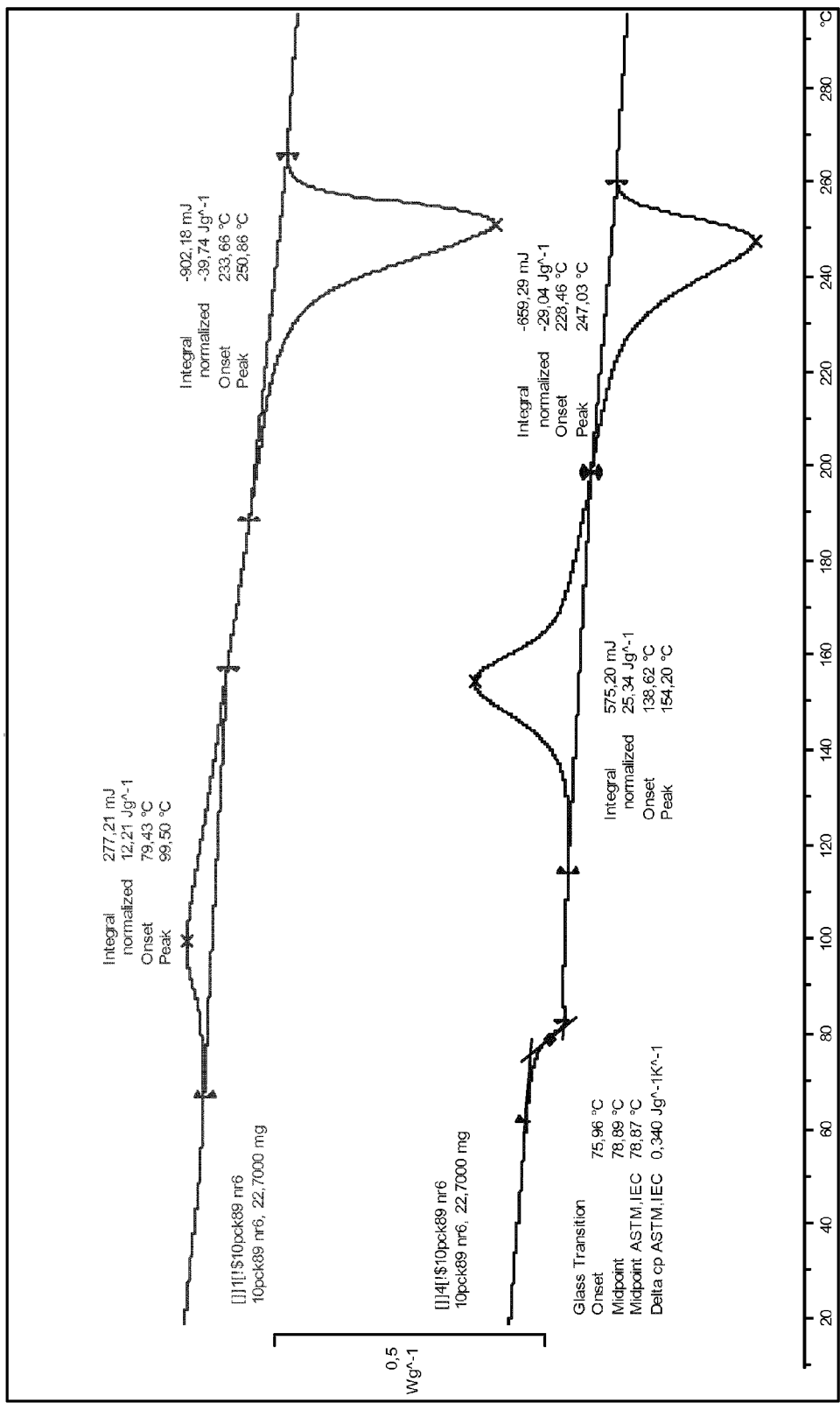
FIG. 4 shows the DSC curves of drawn film B at a draw ratio of MDR=4.6.

The DSC curves of drawn film B at a draw ratio of MDR=4.6 are shown in FIG. 4. The first DSC heating run does not show a glass transition and shows only a minor recrystallisation peak, with corresponding heat of recrystallisation of 12 J/g and peak temperature of 100° C. Further heating results in a melting peak with corresponding heat of fusion of 40 J/g and peak temperature of 251° C. The film is thus crystalline, with a latent heat of fusion of 40−12=28 J/g, corresponding to 70% of its maximum crystallinity.

TABLE 4

Mechanical properties measured in the longitudinal direction and the transverse direction for cast polyester films and polyester film according to the LDO process of this invention (film recipes according to Table 1), Testing speed 40 mm/min.

| | Longitudinal direction | | | | Transverse direction | | | |
|---|---|---|---|---|---|---|---|---|
| | Yield* | Break | | | Yield* | Break | | |
| | Stress (MPa) | Strain (%) | Stress (MPa) | Modulus MPa | Stress (MPa) | Strain (%) | Stress (MPa) | Modulus MPa |
| Cast film (recipe B) | 55 | 780 | 77 | 1690 | 53 | 790 | 80 | 1605 |
| Cast film (recipe C) | 52 | 710 | 60 | 1940 | 57 | 670 | 60 | 1970 |
| Cast film (recipe D) | 52 | 710 | 60 | 1940 | 57 | 670 | 60 | 1970 |
| Cast film (recipe E) | 48 | 710 | 55 | 1550 | 44 | 770 | 67 | 1520 |
| LDO film (recipe B) | — | 24 | 300 | 6370 | 45 | 126 | 34 | 1870 |
| LDO film (recipe C) | — | 18 | 290 | 7200 | 40 | 690 | 53 | 1680 |
| LDO film (recipe D) | — | 18 | 290 | 7200 | 40 | 690 | 53 | 1680 |
| LDO film (recipe E) | — | 19 | 350 | 7320 | 37 | 180 | 30 | 1540 |

*values for stress are indicated only in case of a distinct zero-slope yield point

TABLE 5

Ductility of polyester films measured at 400 mm/min testing speed, directly after production and after two weeks storage at ambient conditions.

|  | Machine Direction | | Transverse Direction | |
| --- | --- | --- | --- | --- |
|  | Directly | After storage | Directly | After storage |
| Cast film (recipe B) | 100 | 80 | 100 | 100 |
| Cast film (recipe C) | 100 | 100 | 100 | 100 |
| Cast film (recipe D) | 100 | 100 | 100 | 100 |
| Cast film (recipe E) | 100 | 70 | 100 | 25 |
| LDO film (recipe B) | n.d. | 100 | n.d. | 100 |
| LDO film (recipe C) | n.d. | 100 | n.d. | 100 |
| LDO film (recipe D) | n.d. | 100 | n.d. | 100 |
| LDO film (recipe E) | n.d. | 100 | n.d. | 100 |

The drawn films according film recipes B, C, D and E were laminated onto electrolytically chromium/chromium oxide coated steel (ECCS), using a set of laminating rollers and employing a metal strip preheat temperature of 220° C. for film recipes B, C and E, and 240° C. for film recipe D. From the polymer-coated metal strips, 7.5×15 cm² flat panels were cut and Erichsen domes were applied to the flat panels. Adhesion of the polymer coating after sterilisation processing was determined by immersing the panels into a sterilisation solution, and heating in the sterilisation solution during 60 minutes at 121° C. using a pressure cooker. After sterilisation, the panels were removed from the solution, an X-scribe was applied to the Erichsen dome, and the coating was removed using adhesive tape (Scotch No. 610). The amount of coating delamination is rated on a scale from 0 (excellent adhesion, no delamination) to 5 (poor adhesion, complete delamination). Sterilisation solutions containing 18.7 g/l NaCl and 10, 15, 20 or 30 g/l acetic acid in demineralised water were used.

Sterilisation solution 1: 18.7 g/l NaCl and 10 g/l acetic acid in demineralised water Sterilisation solution 2: 18.7 g/l NaCl and 15 g/l acetic acid in demineralised water Sterilisation solution 3: 18.7 g/l NaCl and 20 g/l acetic acid in demineralised water Sterilisation solution 4: 18.7 g/l NaCl and 30 g/l acetic acid in demineralised water Comparative Examples 1-3

As Comparative Examples, polymer films according to recipes B, C and E were extruded using the same extrusion equipment and laminated directly onto the steel substrate without intermediate winding and stretching, according to EP 1019248.

Adhesion results after sterilisation in the above mentioned solutions are listed in Table 6. As can be seen, adhesion after sterilisation performance of the materials according to the present invention is as good or better than the performance of the extrusion-coated reference material, while the material of the present invention can be produced at much higher speed than is allowable by the extrusion coating process.

TABLE 6

Adhesion rating on a scale from 0 (excellent) to 5 (poor) after sterilisation in various solutions during 60 minutes at 121° C.

|  |  | Sterilisation solution | | | |
| --- | --- | --- | --- | --- | --- |
| Example | Polymer film type | 1 | 2 | 3 | 4 |
| Example 2 | LDO fim, recipe B | 0 | 2 | 5 | 5 |
| Example 3 | LDO fim, recipe C | 0 | 0 | 4 | 5 |
| Example 4 | LDO fim, recipe D | 0 | 1 | 4 | 5 |
| Example 5 | LDO fim, recipe E | 0 | 0 | 4 | 5 |
| Comparative Example 1 | Extrusion coated, recipe B | 0 | 2 | 5 | 5 |
| Comparative Example 2 | Extrusion coated, recipe C | 0 | 1 | 4 | 5 |
| Comparative Example 3 | Extrusion coated, recipe E | 0 | 0 | 3 | 5 |

The invention claimed is:

1. A process for producing a polymer coated metal substrate comprising the steps of:
providing a metal strip as a substrate;
providing a polymer film, consisting of one or more layers, for coating onto the substrate;
optionally providing an adhesion layer for promoting the adhesion between the substrate and the polymer film;
wherein the polymer film consisting of one or more layers is produced by:
melting a suitable mixture of polymer granules in one or more extruders to make molten polymer;
passing the molten polymer through one or more dies or calendars to form the polymer film consisting of the one or more layers;
cooling the extruded polymer film to form a solid polymer film;
trimming the edges of the extruded polymer film;
reducing the thickness of the solid polymer film by stretching the solid polymer film in a stretching unit by exerting a stretching force only in the longitudinal direction;
optionally trimming the edges of the stretched polymer film;
laminating the stretched polymer film onto the substrate to produce a polymer-coated substrate;
post-heating the polymer-coated substrate to reduce the orientation and crystallinity of the polymer film;
cooling the post-heated polymer-coated substrate.

2. The process according to claim 1, wherein the solid polymer film is wound onto a reel prior to being fed to the feeding roll of the stretching unit.

3. The process according to claim 1, wherein the solid polymer film is fed directly to the feeding roll of the stretching unit.

4. The process according to claim 1, wherein the ratio of the width of the solid film after the stretching step in the stretching unit and the width of the solid film prior to the stretching step in the stretching unit (WR) is at least 0.7 and at most 1.

5. The process according to claim 1, wherein film draw ratio is between 3 and 12.

6. The process according to claim 1, wherein the lamination pressure in the laminating step is between 0.1 MPa and 10 MPa.

7. The process according to claim 1, wherein the trimmed-off material resulting from the trimming of the edges of the extruded polymer film and/or the stretched polymer film is fed back into one or more of the extruders after intermediate reprocessing of the trimmed-off material or immediately after trimming.

8. The process according to claim 1, wherein the film draw ratio is 4 to 12.

9. The process according to claim 1, wherein the film draw ratio is 3 to 6.

10. The process according to claim 1, wherein the film draw ratio is 4 to 6.

11. The process according to claim 1, wherein the lamination pressure in the laminating step is 0.1 MPa and 2.5 MPa.

12. The process according to claim 1, wherein the lamination pressure in the laminating step is 0.5 MPa to 10 MPa.

13. The process according to claim 1, wherein the lamination pressure in the laminating step is 0.5 MPa to 2.5 MPa.

14. The process according to claim 1, wherein the longitudinally stretched film comprises one or more of a polymer from the group of polymers consisting of:
   polycondensates,
   non-crystallisable vinyl polymers, and
   crystallisable polyaddition polymers.

15. The process according to claim 1, wherein the longitudinally stretched film comprises a polymer selected from the group consisting of polyethylene terephthalate, IPA-modified polyethylene terephthalate, CHDM-modified polyethylene terephthalate, polybutylene terephthalate, polyethylene naphthalate, and copolymers or blends thereof.

* * * * *